Figure 1:
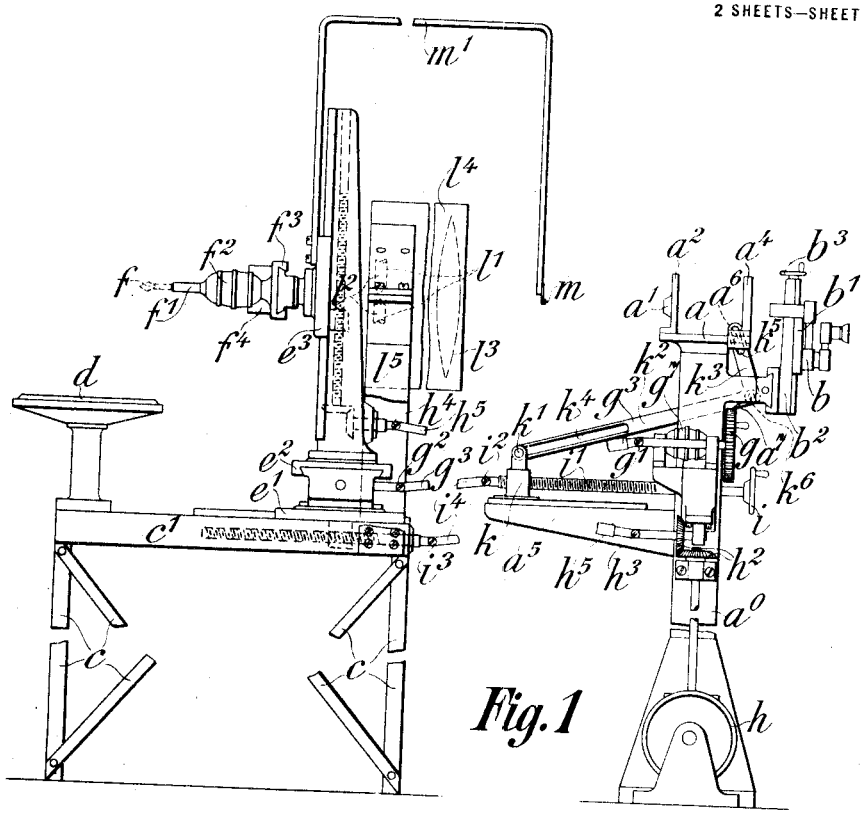

W. BAUERSFELD.
COPYING DEVICE.
APPLICATION FILED DEC. 20, 1913.

1,138,347.

Patented May 4, 1915.
2 SHEETS—SHEET 1.

W. BAUERSFELD.
COPYING DEVICE.
APPLICATION FILED DEC. 20, 1913.
1,138,347.
Patented May 4, 1915.
2 SHEETS—SHEET 2.
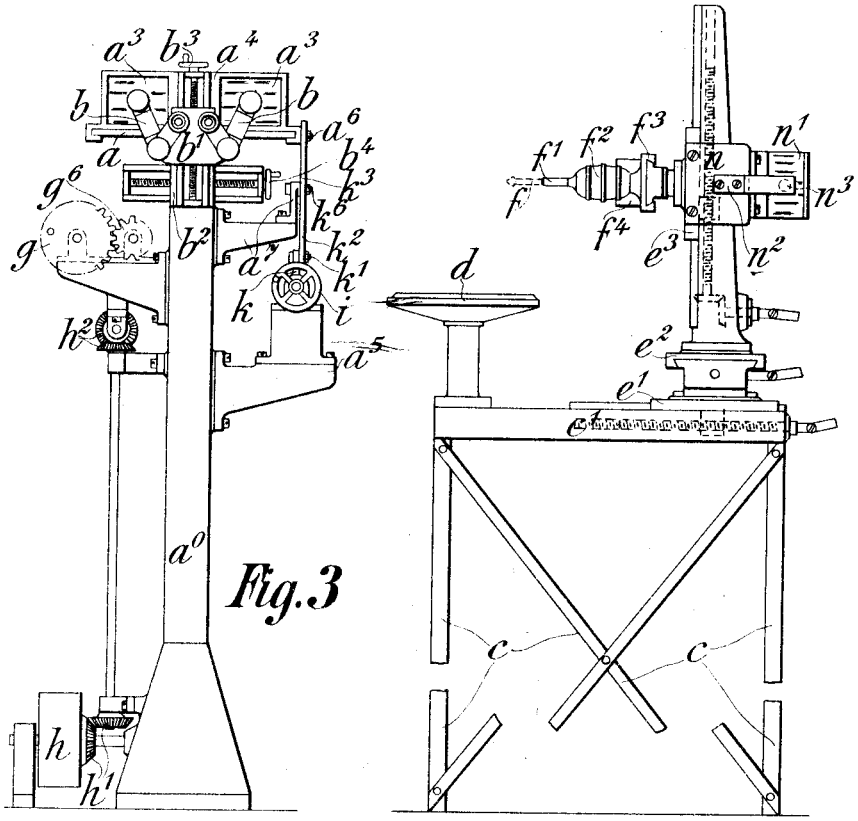
Fig. 3
Fig. 4
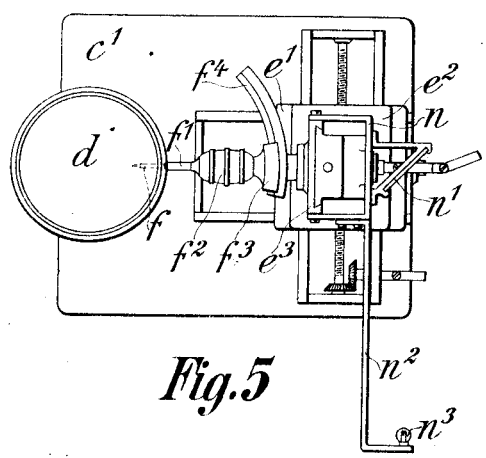
Fig. 5
Witnesses:
Inventor:
Walther Bauersfeld.

UNITED STATES PATENT OFFICE.

WALTHER BAUERSFELD, OF JENA, GERMANY, ASSIGNOR TO THE FIRM OF CARL ZEISS, OF JENA, GERMANY.

COPYING DEVICE.

1,138,247. Specification of Letters Patent. Patented May 4, 1915.

Application filed December 20, 1913. Serial No. 808,004.

*To all whom it may concern:*

Be it known that I, WALTHER BAUERSFELD, a citizen of the German Empire, residing at Jena, Germany, have invented a new and useful Copying Device, of which the following is a specification.

The present invention relates to devices, which serve for the direct and continuous copying of the surface, to be obtained from a stereoscopic pair of photographic plates (*e. g.* negatives), of a spatial form or of punctual or linear elements of the said surface (*e. g.* of lines of height, breadth or depth) either in space or on a plane surface (or one that may be developed into a plane, *e. g.* a cylindrical surface) and which are fitted for that purpose with a copying system, in which a copying tool and a copy-carrier are combined for relative motion in space or in a plane surface (or one that may be developed into a plane), in copying with which, therefore, no calculations or intermediate settings are required.

Devices of this kind have already been proposed. According to the British patent specification 2,492 of the year 1911, for copying the object-surface to be obtained from a photo-stereogram a comparator system and a copying system are positively connected together in such a manner that the position of the tool-point relatively to the copy-carrier corresponds in each case to the position of that point on the object-surface, the images of which are seen in the comparator system as coinciding with the mark of the latter. It is obvious, that sources of error may be inherent in the mechanisms, which transmit the movements of the comparator system to the copying system, which sources of error might result in the movements of the copying system not corresponding accurately with those of the comparator system.

In order that the copying system may be independent of such errors of transmission, according to the present invention the above mentioned transmission of motion is avoided and a mark, which is connected with the tool or the copy-carrier, is presented by means of an illuminating device to two objectives, each of which is disposed on that side of the plate belonging to it, which faces the copying system, in such a manner that the position of its axis with regard to the said plate is the same as that of the axis of the objective used, when the plate was exposed, with regard to the exposed plate. It is also requisite, that the mark be connected with the tool or the copy-carrier in such a manner and be presented to the objectives in such a manner that that point, which happens to be indicated by the tool-point on the copy-carrier, corresponds to that point on the object-surface, the images of which coincide on the two plates with the images of the mark.

Through the British patent specification 2,492 of the year 1911 a device capable of being used for continuous copying became known, which is also free from the above mentioned errors of transmission, but possesses several disadvantages, which are obviated by this invention.

As in this device the images of the tool-point, which serves as the mark, do not fall directly on the plates, but on images of the plates, the copy is dependent on the quality of these images, *e. g.* on the errors due to the distorting action of the lenses used. A further disadvantage is incidental to the employment of half-silvered reflecting surfaces in the forming of an image both of the mark and of the plates. As these reflecting surfaces allow a great part of the rays of light to get lost, the images of the mark and of the plates are comparatively dark. In the British Patent 9190 of the year 1912 a device is described, which also avoids the above mentioned errors of transmission. This device, however, has the great disadvantage, that it does not permit of continuous copying, as for the setting of the tool-point with regard to the copy-carrier a displacement of the plates is necessary for each single object-point, which may also cause errors of transmission.

In the present specification the simplest case shall be assumed, that, when the plates were being exposed, they lay in one plane, that the negatives were made with identical objectives, that the connecting line of these objectives (the base-line) was horizontal and that the axes of the objectives were horizontal, parallel to each other and perpendicular to the base-line. These conditions must then also be fulfilled during copying. If in addition to this the same length of base-line and the same image distance (*i. e.* the same distance of the objective from the plate) be chosen, as when the plates were being exposed, on copying spatially the tool-point will trace out on the copy-carrier the surface of a body, which is exactly equal to the original one. If the length of the base-line be altered, the distance of the image, however, be retained, the body, the surface of which is traced out by the tool-point on the copy-carrier on a spatial copy being made, is similar to the original one. If, however, the length of the base-line be retained and the distance of the image altered, the body, the surface of which is traced out by the tool-point on the copy-carrier, on a spatial copy being made, certainly possesses the same dimensions as to height and breadth as the original body, but its depth-dimensions are altered. This latter method can therefore be employed, where a body is to be produced having altered depth-dimensions, *e. g.* a relief.

For observing the images of the mark on the plates, a double microscope may be disposed on the side of the plates remote from the objectives, which double microscope can be displaced at will parallel to the plane of the plates. This displacement of the double microscope has no influence on the copying process, as the position of the mark is independent of that of the double microscope. A double microscope for binocular observation is preferable to one for unipcular observation, as it permits of a continuous copying of any linear elements of the object-surface.

For spatial copying the tool and the mark are guided in such a manner that the connecting line of the tool-point with the mark remains parallel to itself. (When the tool is stationary and the copy-carrier movable, the mark and the copy-carrier must be guided in such a manner that the connecting line of a point on the copy-carrier with the mark remains parallel to itself.) This result is obtained, for instance by journaling the tool and the mark (or in the other case the copy-carrier and the mark) on the top slide of a spatial cross-slide system consisting of a height-slide, a breath and a depth-slide in any sequence. It is simplest to journal the tool on the cross-slide system and to make the relatively heavy copy-carrier stationary. With such an arrangement the tool itself may be either journaled non-rotatably or, where it is to consist for instance of a rotating cutter, journaled rotatably. In order to be able to copy continuously, the copyist may best manipulate, when a cross-slide system is used, the actuating means of the latter, which must be available to him while he is observing the plates, in such a manner that the tool-point traces on the copy-carrier height-lines (lines of equal height), breadth-lines (lines of equal breadth) or depth-lines (lines of equal depth). The distances of the height-planes, the breadth-planes or the depth-planes from one another may be as small as desired, so that each punctual element of the surface of the object is copied. For copying a height-line the height-slide, for copying a breadth-line the breadth-slide and for copying a depth-line the depth-slide is set on the slide next below it, in a given case on the guide of the bottom slide, and is fixed there, so that the copyist has to actuate only two slides. When one of these two slides is driven automatically, which may be of advantage under certain circumstances, the manipulation of the copying system becomes particularly simple for the copyist. When, however, any required linear or punctual elements of the surface of the object are to be copied, the copyist must set all the slides. For this purpose the actuating means of one of the slides may be arranged to be driven by foot. If, when employing a cross-slide system, the copying device is to be used for the copying of height-lines in one plane, it will be found best to dispose the height-slide as the top slide, to set it to correspond to the chosen height on the intermediate slide and fix it there, and to fit it with the mark, while the upper one of the two other slides, the sequence of which is immaterial, is fitted with the tool. A corresponding arrangement may be applied to the copying of lines of breadth and lines of depth in one plane. Were another sequence to be chosen for the three slides, both the tool and the mark would have to be fitted to the top slide and a relative adjustability of the tool and the plane of the drawing, perpendicular to the latter, be provided for. When contour-lines are to be copied in one plane, the top slide is again fitted with the mark and the upper one of the two remaining slides with the tool. In this case, however, the copyist has to actuate all the slides, so that the mark traces out in space the body to be copied, while the tool indicates the contour-lines of the said body in the plane of the drawing.

If, when copying spatially, the mark is not presented to the two objectives directly, but with the help of a reflecting system, which with a fixed copy-carrier is connected with the tool in such a manner that the reflected image of the mark coincides with the tool-point, parallel motion for the tool may be dispensed with.

In order to present images of the mark to the observer, that stand out clearly from the background of the plate, either a bright or a dark mark may be used. For this purpose any illuminating device of a known kind, comprising any required number of sources of light, may be employed. The constructional form of the mark is immaterial; a bright mark may be formed, for instance, by a diaphragm-aperture disposed behind the illuminating device or by a small sphere reflecting the impinging rays of light, and a dark mark, for instance, by a small metal rod disposed behind the illuminating device.

In the case where a bright mark is employed, it will be found to be of advantage, to provide an auxiliary illuminating device for either plate, in order to lighten the dark background of the plate, so that the observation of the object-surface contained in the plate may be facilitated. When employing a dark mark this auxiliary illumination of the plates may be dispensed with, as a great portion of the rays of light passing the mark serves for lightening the background of the plates surrounding the mark. When the illuminating device, by means of which the mark is presented to the two objectives, is provided with one source of light only, it will be found to be particularly advantageous to let the source of light itself serve as the mark.

When a dark mark is employed, it is well to fit the illuminating device with a condenser and two sources of light, and to movably dispose the mark behind the condenser in such a manner that both sources of light serve jointly for forming an image of the mark, each source of light lighting up one of the plates.

In order that the images of the mark on the plates may be presented invariably sharply to the observer, even when the mark (or its reflected image) belongs successively to different depth-planes, the condition must be fulfilled, that the sum of the reciprocal distance of the depth-plane in question from the front principal point of the objective and the reciprocal distance of the corresponding image-plane from the rear principal point of the objective is equal to the reciprocal focal length of the said objective. If this focal length be constant, the sum of the above mentioned reciprocal distances must also be constant, i. e. on one distance being varied, the other must be also varied in accordance with the above condition. When a cross-slide system is used, provided that small errors of transmission do not matter, for this purpose a coupling between the depth-slide and the plates may be provided with advantage.

Figure 2:
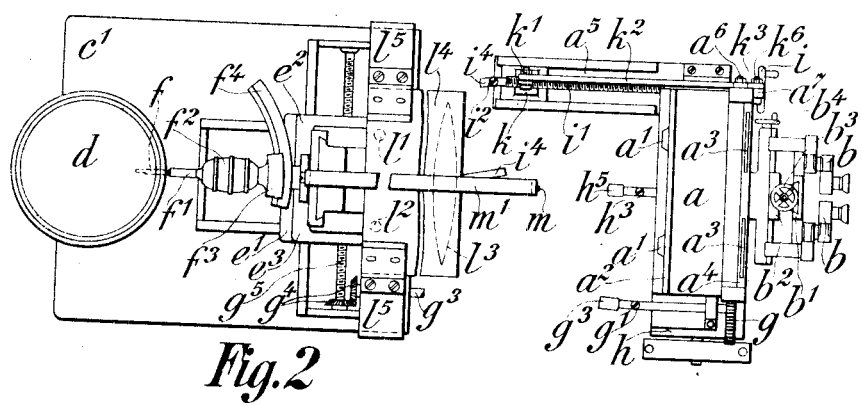

In the annexed drawing: Figures 1 to 3 show an example of how the invention may be realized, in which the device serves for spatial copying and the copy-carrier is stationary. Fig. 1 being a front elevation, Fig. 2 a plan and Fig. 3 a side elevation. Figs. 4 and 5 show an elevation and plan respectively of a second constructional example of the invention.

In Figs. 1 to 3, on a foundation plate $a$, which is fixed to a support $a^1$, there are mounted an objective-board $a^2$ fitted with two objectives $o^1$ and a plate-frame $a^3$ provided with two photographic plates $a^4$. The plates lie in one plane and the frame containing them is displaceable in a direction perpendicular to the said plane. The connecting line of the objectives is horizontal, and the objective axes are horizontal, parallel to one another and perpendicular to the plane of the plates.

For observing the plates a binocular microscope $b$ is provided, which is mounted on the upper slide $b^1$ of a cross-slide system $b^1, b^2$ comprising two slides $b^1$ and $b^2$. This cross-slide system is fitted to the support $a^1$, its upper slide $b^1$ can be displaced by means of a hand-wheel $b^3$ in the vertical direction and its lower slide $b^2$ by means of a hand-wheel $b^4$ parallel to the plane of the plates $a^4$ in the horizontal direction.

To the stand $c$ a table-top $c^1$ is fixed, which carries a table $d$, to which the copy-carrier would be fixed.

On the table-top there is further mounted a three-part spatial cross-slide system $e^1, e^2, e^3$, which comprises a depth-slide $e^1$, a breadth-slide $e^2$ and a height-slide $e^3$.

The depth-slide is the bottom slide of the system and is guided in a straight line on the table-top, the breadth-slide forms the intermediate and the height-slide the top member. The height-slide can be fitted with the tool, which in the drawing is indicated as a borer $f$ coupled to the shaft $f^1$ of a motor $f^2$. In order that the inclination of the tool with respect to the copy-carrier may be varied at will, the motor $f^2$ is mounted on a slide $f^3$, which may be set in an arc-shaped guide $f^4$ in such a manner that the tool-point retains its position, and the said guide is journaled to the height-slide in such a manner that it may be rotated about an axis, which is parallel to the direction of displacement of the depth-slide and contains the tool-point.

While the actuating means of the breadth-slide and the depth-slide are made accessible each to one of the hands of the copyist, the actuating means of the height-slide are arranged to be driven by foot.

The breadth-slide $e^2$ is actuated by a hand-wheel $g$, which is coupled by means of two Hooke's joints $g^1$ and $g^2$, which are connected together by a shaft of variable length, and by means of a pair of bevel wheels $g^4$ to a horizontal screw-spindle $g^5$, which serves for the displacement of the breadth-slide. The hand-wheel $g$ is provided with teeth, with which a pinion $g^6$ engages, which latter, when an automatic displacement of the breadth-slide is desired, may be coupled to a motor $g^7$. The height-slide $e^3$ is actuated by a disk $h$, which is mounted at the foot of the support $a^0$, and is coupled by two pairs of bevel wheels $h^1$ and $h^2$, two Hooke's joints $h^3$ and $h^4$, which are connected together by a shaft $h^5$ of variable length, and by a further pair of bevel wheels to a vertical spindle, which—corresponding to the actuation of the breadth-slide—serves for the displacement of the height-slide.

The depth-slide $e^1$ is actuated by a hand wheel $i$, which is coupled by a spindle $i^1$ and two Hooke's joints $i^2$ and $i^3$, which are connected to each other by a shaft $i^4$, to a horizontal spindle, which serves for displacing the depth-slide. The spindle $i^5$ is connected to a sliding part $k$, which is guided in a straight line on the arm $a^5$ of the support $a^0$ in a direction parallel to that of the displacement of the depth-slide, in such a manner that to a rotation of the spindle there corresponds a displacement of the said sliding part, which is oppositely directed to the direction of displacement of the depth-slide; when, as is necessary, the spindle $i^1$ is oppositely threaded to the actuating spindle of the depth-slide. The sliding part $k$ is fitted with a pin $k^1$ and the plate-frame $a^4$ with a pin $a^6$; a bell-crank $k^2$, $k^3$ engages by means of a slot $k^4$ in its arm $k^2$ the pin $k^1$ and by means of a slot $k^5$ in the arm $k^3$ the pin $a^6$. This bell-crank is pivoted on a pin $k^6$, which is fixed to an arm $a^7$ of the support $a^0$, and its arms are so chosen as regards their position and relative inclination that to every displacement of the depth-slide there corresponds such a displacement of the plate-frame, that the equation of condition, which holds good for the formation of a sharp image between image-distance, depth of mark and objective focal length, is maintained.

The illuminating device indicated in the drawing comprises two arc lamps $l^1$ and $l^2$ and a condenser $l^3$, the axis of which is horizontal and at the same time perpendicular to the plane of the plates. The said illuminating device is contained in a casing $l^4$, which is fixed by means of two supports $l^5$ to the table top $c^1$. The arc-lamps are so positioned with regard to the condenser that either arc lamp serves for the illumination of one of the plates $a^3$.

Behind the illuminating device a mark $m$ consisting of a small metal disk is fixed to a bent bar $m^1$, which is fixed to the height-slide $e^3$.

If—with the same sequence of slides of the cross-slide system—the tool $f$ were to be fixed to the breadth-slide $e^2$ and a horizontal drawing surface were to be disposed on the table $d$ as the copy-carrier, the device could be used, the tool being suitably formed, for projecting contour-lines of the object-surface onto the plane of the drawing.

In Figs. 4 and 5 the device shown is intended to be used for spatial copying and the copy-carrier is stationary. The disposition of the objectives, the plates, the observation system and the actuating means corresponds to the former constructional example and is not shown in the figures of the second constructional example. As in the former example, there is fixed to a support $c$ a table-top $c^1$, on which there is mounted for the reception of the copy-carrier a table $d$ and for the reception of the tool a three-part cross-slide system $e^1$, $e^2$, $e^3$, which comprises a depth-slide $e^1$, a breadth-slide $e^2$ and a height-slide $e^3$ in the same sequence as in the former constructional example. The manner of mounting the tool on the height-slide is the same as in Figs. 1 and 2. The tool is indicated by $f$, $f^1$ is the motor shaft, $f^2$ the motor, $f^3$ the slide, to which the motor is fixed, and $f^4$ the arc-shaped guide, along which the slide $f^3$ can be set. The height-slide $e^3$ carries a strap $n$, to which a plane reflector $n^1$ and the holder $n^2$ of a small incandescent lamp $n^3$, which serves as the mark, are fixed. The reflector is vertical and is inclined by 45° to the plane of the plates, and the incandescent lamp is so positioned with regard to the reflector that it and the tool-point lie symmetrically to the plane of the reflector, so that its reflected image coincides with the tool-point.

The operation of the device as shown in the drawing is as follows: A stereoscopic pair of photograms of any object having been placed in the frame $a^4$ and a block of suitable material having been mounted on the table $d$, the operator, while observing the spatial image of the object presented by the double microscope, brings the spatial image of the mark $m$, which results from the two images of the mark, formed in the plane of the photograms by the two objectives $a^1$, into coincidence with any point on the surface of the said spatial image, by manipulating the three actuating devices of the cross-slide system $e^1$, $e^2$, $e^3$ by means of the hand-wheels $i$ and $g$ and the foot-wheel $h$ respectively. He thereupon causes the spatial image of $m$ to move over the whole of the surface of the spatial image of the object, which is visible in the field of view of the microscope. This movement of the mark $m$ is accompanied by a corresponding movement of the point of the rotating tool $f$, which is thus caused to work out on the block of material a surface corresponding exactly to that presented by the microscope. The whole field of view of the microscope having in this way been worked over, the microscope is shifted by means of its cross-slide system, so as to bring another part of the photograms into the field of view, whereupon the copying is proceeded with as above, until the entire surface of the object has been reproduced. Should it be required to trace lines of height, breadth or depth with the apparatus, the operator fixes the height-slide, the breadth-slide or the depth-slide respectively on the slide next below it and has then to manipulate only the actuating devices of the other two slides. For instance, when tracing a height-line on the block of material, the operator clamps the height-slide $e^3$ at the required height and traces the desired line by manipulating the wheels $i$ and $g$. In the example shown in the drawing the tracing of a height-line may be simplified by the breadth-slide being driven by the motor $g^7$, so that all the operator has to do is to manipulate the handle $i$.

I claim:

1. In a copying device for direct and continuous copying a copying system comprising a copy-carrier and a copying tool, means adapted to displace the said copy-carrier and the said copying tool relatively to one another, a system of actuating devices adapted to operate the said means, a mark connected with the said copying system and adapted to share the said relative displacement, a stereoscopic system comprising a stereoscopic pair of photograms of the object to be copied and two objectives disposed in juxtaposition to the said pair of photograms and on that side of them which faces the said copying system, means for observing the said photograms and an illuminating device adapted to present the said mark to the said objectives, each of which latter is adapted to form an image of the said mark on the photogram opposite to it.

2. In a copying device for direct and continuous copying a copying system comprising a copy-carrier and a copying tool, means adapted to displace the said copy-carrier and the said copying tool relatively to one another, a system of actuating devices adapted to operate the said means, a mark connected with the said copying system and adapted to share the said relative displacement, the connecting line between the mark and the tool-point remaining parallel to itself during such displacement, a stereoscopic system comprising a stereoscopic pair of photograms of the object to be copied and two objectives disposed in juxtaposition to the said pair of photograms and on that side of them which faces the said copying system, means for observing the said photograms and an illuminating device adapted to present the said mark to the said objectives, each of which latter is adapted to form an image of the said mark on the photogram opposite to it.

3. In a copying device for direct and continuous copying a copying system comprising a copy-carrier and a copying tool, a spatial cross-slide system adapted to displace the said copy-carrier and the said copying tool relatively to one another, a system of actuating devices adapted to operate the said cross-slide system, a mark connected with the said copying system and adapted to share the said relative displacement, a stereoscopic system comprising a stereoscopic pair of photograms of the object to be copied and two objectives disposed in juxtaposition to the said pair of photograms and on that side of them which faces the said copying system, means for observing the said photograms and an illuminating device adapted to present the said mark to the said objectives, each of which latter is adapted to form an image of the said mark on the photogram opposite to it.

4. In a copying device for direct and continuous copying a copying system comprising a copy-carrier and a copying tool, a spatial cross-slide system consisting of a height-slide, a breadth-slide and a depth-slide adapted to displace the said copy-carrier and the said copying tool relatively to one another, a system of actuating devices adapted to operate the said cross-slide system, a mark connected with the said copying system and adapted to share the said relative displacement, a stereoscopic system comprising a stereoscopic pair of photograms of the object to be copied and two objectives disposed in juxtaposition to the said pair of photograms and on that side of them which faces the said copying system, means for observing the said photograms and an illuminating device adapted to present the said mark to the said objectives, each of which latter is adapted to form an image of the said mark on the photogram opposite to it.

5. In a copying device for direct and continuous copying a copying system comprising a copy-carrier and a copying tool, a spatial cross-slide system consisting of a height-slide, a breadth-slide and a depth-slide adapted to displace the said copy-carrier and the said copying tool relatively to one another, a system of actuating devices adapted to operate the said cross-slide system, a mark connected with the said copying system and adapted to share the said relative displacement, a stereoscopic system comprising a stereoscopic pair of photograms of the object to be copied and two objectives disposed in juxtaposition to the said pair of photograms and on that side of them which faces the said copying system, means adapted to displace the said photograms relatively to the said objectives, each in the direction of the axis of the objective belonging to it, coupling means between the said photograms and the said depth-slide, means for observing the said photograms and an illuminating device adapted to present the said mark to the said objectives, each of which latter is adapted to form an image of the said mark on the photogram opposite to it.

WALTHER BAUERSFELD.

Witnesses:
PAUL KRÜGER,
RICHARD HAPER.